Oct. 12, 1943.  M. J. JOHNSON  2,331,475
PHOTOELECTRIC CONTROL DEVICE
Filed Oct. 10, 1940  4 Sheets-Sheet 1

INVENTOR
Manfred J. Johnson
BY Johnson, Kline & Smyth
ATTORNEYS Oct. 12, 1943.                M. J. JOHNSON                2,331,475
                        PHOTOELECTRIC CONTROL DEVICE
                        Filed Oct. 10, 1940              4 Sheets-Sheet 2

INVENTOR
*Manfred J. Johnson*
BY
*Johnson, Kline & Smyth*
ATTORNEYS

Oct. 12, 1943.  M. J. JOHNSON  2,331,475
PHOTOELECTRIC CONTROL DEVICE
Filed Oct. 10, 1940  4 Sheets-Sheet 4

INVENTOR
Manfred J. Johnson
BY Johnson, Kline & Smyth
ATTORNEYS

Patented Oct. 12, 1943

2,331,475

UNITED STATES PATENT OFFICE 2,331,475

PHOTOELECTRIC CONTROL DEVICE

Manfred J. Johnson, New Haven, Conn., assignor of one-half to Arthur A. Johnson, Bridgeport, Conn.

Application October 10, 1940, Serial No. 360,561

23 Claims. (Cl. 250—41.5)

This invention relates to a method and apparatus for effecting a control in response to a change in magnitude of a condition, and, more particularly, to a change in the magnitude of a luminous condition.

Devices have been heretofore proposed for effecting a control in response to some change in a luminous condition, but these prior devices as they consisted generally of complicated and relatively expensive electrical apparatus have not been widely used. The complicated and intricate structure of these devices prevented many potential users from employing the same, not only because of the prohibitive cost due to the intricate and relatively expensive mechanism employed, but also due to the fact that they could not be made sufficiently adaptable for widely diversified fields of use.

It is an object of the present invention to provide a compact, easily transportable and rugged device for accurately effecting a control in response to a predetermined change in a luminous condition, and requiring a minimum amount of power for its continuous operation.

More specifically, it is an object of the invention to provide a device for the aforesaid purpose in which the necessity of employing a source of energy, other than that provided by a luminous condition, variations of which would affect the response of the control device, is avoided.

It is a further object of the invention to provide such a device which can be easily and conveniently adapted for use in many widely diversified fields of use, which requires for its use no theoretical knowledge of the manner in which the device functions, and which can be cheaply produced in mass production.

Another object of the invention is to provide a simplified control device for automatically effecting a control in response to a change in the absolute magnitude of a luminous condition.

Still another object is to provide a simplified control device for automatically effecting control in response to a change in the relative magnitude of two luminous conditions, and providing a plurality of responses depending upon the mutual relationship of said conditions.

In the broader aspects of the invention, a current-producing means is employed for producing an electric current proportional in magnitude to the magnitude of the luminous condition. In the more specific aspects of the invention, the current-producing means is a photoelectric generator cell, sometimes called a barrier type cell, adapted to receive light from a source, the luminous condition of which is the determining factor in the control.

If it is desired to render the device responsive to a change in the relative magnitude of two luminous conditions, a pair of photoelectric generator cells are used, receiving light respectively from two sources to be compared, and connected differentially to produce a resultant electric effect, such as a current or an electro-magnetic field, proportional to the difference between the illumination of the two generators.

The current provided by the photoelectric device or devices is conducted directly to an electro-responsive means having a deflectable member, the direction and magnitude of the deflection of which depends upon the direction and magnitude of the current supplied thereto by the photoelectric means.

In the preferred form of the invention, a pair of control circuits are employed, which may be used to affect various types of control devices. The said circuits are both adapted to include the deflectable member and also include respectively a pair of contacts so positioned with respect to said member that the latter is adapted to make electric connection with one or the other of the contacts, or, if desired, to remain out of contact with both, depending upon the direction and magnitude of its deflection.

An automatic circuit-closing member which is periodically operated and which at each operation tests for a change in the deflection of the deflectable member is adapted periodically to close one or the other of the control circuits between one of the said contacts and the deflectable member. The periodically operated circuit-closing member may also be connected to a common terminal in both of said control circuits, whereby it is adapted periodically to complete said circuits through the deflectable member and one or the other of said pair of contacts, depending upon the deflection of the deflectable member.

Thus one or the other of the control circuits may be completed in response to a current produced by the photoelectric device or devices.

A periodically operated switch-closing member may be operated by any suitable means, such as a synchronous electric motor or clockwork mechanism which through a cam arrangement, will intermittently operate the circuit closer at any desired frequency; or the circuit-closing member may be operated intermittently by a thermostatic maker and breaker interposed in a circuit including an electro-magnet, the armature of which is adapted to operate the circuit-closing member as the armature is intermittently attracted by the electro-magnet.

The device in the preferred form of the invention is mounted within a suitable casing, and the elements of the device are so arranged as to be conveniently compact. As a result, the device can be installed in a minimum amount of space and may be conveniently transported and quickly installed at widely spaced points. The elements of the device have been reduced to a minimum, and consist of inexpensive widely used electrical elements so that the device may be cheaply manufactured. The said elements may be made of such rugged construction as to successfully permit the use of the device even under conditions where excessive vibrations are encountered.

The device of the present invention which comprises a single photoelectric generator cell can be successfully used in any field in which it is desired to effect some control in response to a change in the absolute magnitude of a luminous condition, the magnitude of which is the determining factor in the control. For instance, it may be used to operate the switch of the lighting system for illuminating a store window in response to the amount of daylight reaching the window from the outside, turning the lights on when the intensity of the daylight decreases below a predetermined minimum, and extinguishing the lights when the daylight exceeds a predetermined intensity. The device may be similarly used for illuminating and extinguishing electric signs. It may also be used for protection against burglary, for instance, in private homes when temporarily unoccupied, by employing it to turn on a lamp inside the house at night, and to extinguish it during the day.

Another field of use for which the said control device may be employed, is that of effecting a control in response to a change in the intensity of luminous radiation from an incandescent object, such as a mass of molten metal. When used in this manner, it provides an indirect means for remote control in response to the temperature of the object.

The said device may also be used to effect a control where a beam of light is directed from some suitable source onto the photoelectric cell, upon interruption of the beam of light by some object interposed between the source and photoelectric cell.

When two photoelectric generators are used in the control device, acting differentially upon the deflectable member, the said device can be successfully employed in any field in which it is desired to effect some control, or merely to provide an indication, in response to a change in the relative intensity of two luminous conditions. It is especially useful in comparing a variable condition with a standard of comparison.

In the latter form, the said device may be used to effect a control or indication in response to variation in translucency of an object by comparing the light transmitted thereby with a standard. Similarly, the device may be used to effect a control or indication in response to variation in the light reflected by an object by comparing it with a standard, or to react to the relative disparity in the amount of light reflected from a pair of illuminated objects.

It will be understood that the device may thus be used, for instance, to register variations in the light transmitted by a liquid flowing in a conduit, to register variations in the reflecting power of textiles, metals, and other materials having reflecting surfaces, and for many similar applications.

An important advantage of these applications of the device of the present invention for comparing the relative light-transmitting or reflecting power of materials is that a single light source may be used to provide the illumination for both photoelectric devices, whereby the effect of variations in the absolute intensity of the source of light is eliminated in the response.

Other features and advantages will appear from the following description with reference to the accompanying drawings, in which.

In the preferred form of the invention, a casing 20 of some suitable material such as Bakelite, houses the control device per se. The casing 20 comprises a closure or upper member 20a and a lower cup-like base 21 which is provided adjacent the open end thereof with an annular internal flange 22 forming a seat for a disk 23 of some suitable insulation material such as hard rubber.

Supported upon the disk 23 is a D'Arsonval type of instrument comprising an annular shaped permanent magnet 24 formed of a plurality of layers or laminations and having pole pieces which, at their adjacent faces, are recessed or curved concavely, preferably on the arc of a circle, as at 25 and 26. Of course, if desired, any other form of magnet such as a horseshoe magnet having separately affixed pole pieces may be used.

Covering the upper face of the magnet is a disk 27, identical with the disk 23 and being formed of the same material. The disks are adapted to support the movable coil assembly unit of the instrument, and, to this end, brackets 28 and 29 are secured to the disks 23 and 27 respectively by suitable screws so as to bridge apertures formed in said disks, the apertures being continuations of the gap formed between the pole pieces of the magnet.

The core 30 is held in position by being attached as by a screw 31 to an L-shaped bracket 32, which is secured to the disk 27. The coil 33 is arranged on the rectangular coil frame 34 and extends around the core 30 so as to swing between the core and the pole faces 25 and 26 and is pivotally supported between the brackets 28 and 29 in a manner well known in the art.

Since the particular manner of pivotally mounting the coil in its bearings and providing suitable springs therefor, forms no part of the present invention per se, it will not be described herein.

A needle 35, the purpose of which will be hereinafter more fully described, is insulatedly secured to the coil so as to turn therewith.

A photoelectric cell 36, preferably of the voltaic or generator type, is mounted on the upper surface of the disk 27 by means of a yoke 37. Wires 38 are led from the cell to the D'Arsonval instrument in the well-known manner so that the instrument will respond to the current produced by the photoelectric generator when excited, the coil 33 and needle 35 being deflected by an amount substantially proportional to said current.

Obviously, the photoelectric generator 36 need not be mounted in the casing of the control instrument but may be located remotely therefrom, suitable leads replacing the wires 38.

A pair of contacts 39 and 40 are secured to the upper surface of the disk 27 by suitable terminal brackets 41 and 42 respectively. These contacts comprise elongated rod-like members which are provided with screw threads along a portion of their length, extending through threaded apertures formed in the brackets 41 and 42. To permit an adjustment of the contacts, the same extend through the closure member of the casing 20, and are each provided at their outer ends with suitable knobs 44. It will be seen that the contacts may be adjusted with respect to one another by rotation of the knobs 44 in either direction, depending upon the adjustment desired.

Figure 1:
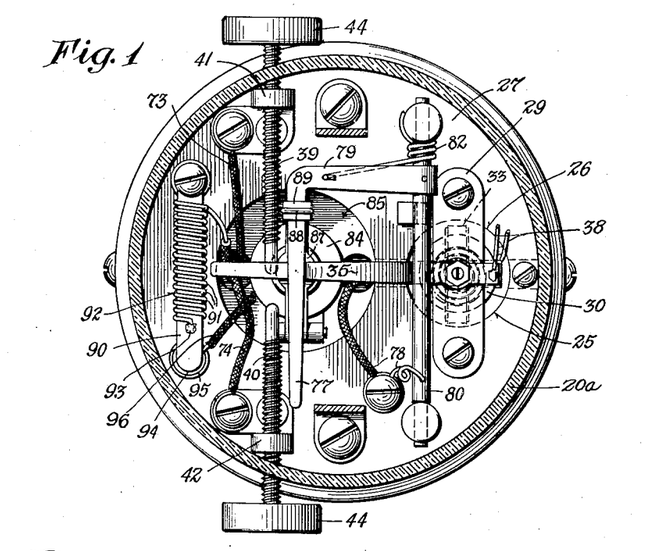
Figure 1 is a sectional view taken along line 1—1 of Fig. 2, showing one form of the invention.

Referring particularly to Fig. 1, the needle 35 of the D'Arsonval instrument, due to the pivotal mounting of the coil to which it is secured, will move over contact 39 or over contact 40 depending upon the angular displacement of the coil 33. The coil, as it is energized by the current produced by the photoelectric generator cell 36, will cause the needle 35 to move in one direction in response to an increase in the illumination of the photoelectric generators, and in the opposite direction when the light activating the device decreases. The needle 35, therefore, will move over one contact when the device is activated in excess of a predetermined amount and over the other contact when the activation of the device decreases below a predetermined value.

To permit this movement to energize one or the other of a pair of control circuits, a movable contact 77 is mounted by means of an arm 79 to a rod 80 pivotally mounted on the upper surface of the disk 27, and is connected by lead 78 to a terminal 81 secured to the bottom wall of the casing 20, which is adapted to be connected to a suitable source of current. The contact 77 is normally held out of engagement with the needle 35 by a spring 82, one end of which is secured to the arm 79, the other being fastened to the rod 80. To prevent wear of the contacting surfaces, due to the arcing that would be set up if the contact 77 and the needle 35 were allowed to constantly engage each other, the contact 77 is caused to be periodically moved into engagement with the needle, forcing the free end of the needle downward. If the needle has been caused to move over one or the other of the contacts 39 or 40, the engagement of the contact 77 with the needle 35, accompanied by depression of the latter will complete one of the control circuits from the source of current through contact 77 and needle 35 to one or the other of the said contacts depending on the position of the needle.

Figure 2:
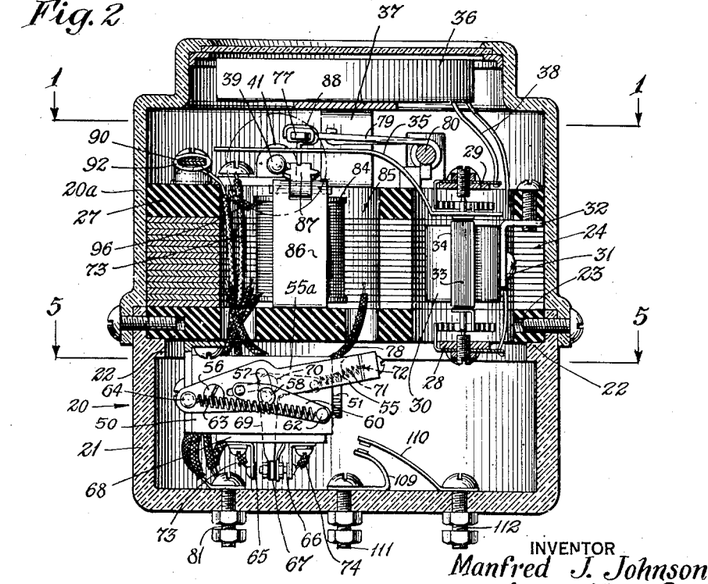
Fig. 2 is a longitudinal vertical section.
Figure 7:
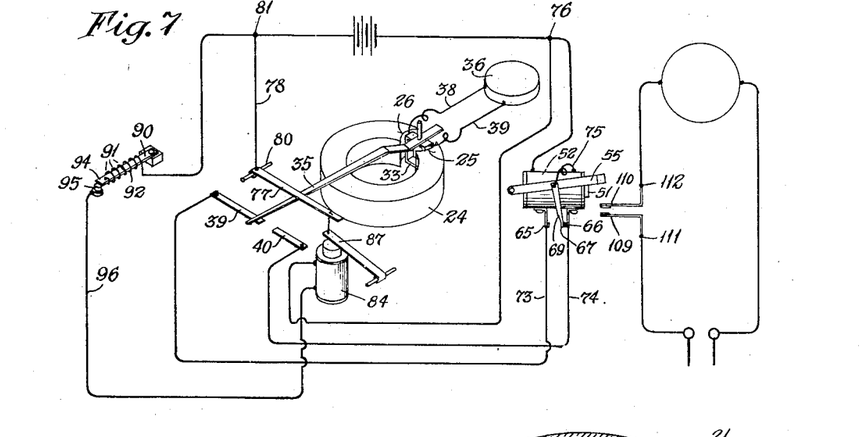
Fig. 7 is a diagrammatic showing of the invention illustrated in Figs. 1 and 2, and 5 showing the circuits employed.

The means employed to periodically move the contact 77 down into engagement with the needle may be of any desired construction, and in the form of the invention illustrated in Figs. 1, 2 and 7, the means comprises an electromagnet 84 mounted within the well 85 of the permanent magnet 24 by a bracket 86 secured to the upper surface of the disk 23. An armature 87 is pivotally secured at one end to the bracket 86 and is provided with a strap connection 88 to an insulating sleeve 89 secured on and carried by the contact 77.

It will be seen that, if the magnet 84 is periodically energized, the armature 87 will be periodically attracted, and consequently, due to the connection 88, the contact 77 will be depressed at each periodic attraction of the armature. To this end, there is interposed in the circuit of the electromagnet, a thermostatic switch which comprises a bimetallic strip 90, one end of which is suitably fastened to the upper surface of the disk 27, having a plurality of turns 91 of the wire 92 coiled around the strip. One end of the wire is connected to the strip at 93, the opposite end being adapted to be connected to a suitable source of current. The free end of the bimetallic strip 90 carries a contact 94 adapted to engage a contact 95 to which is connected the lead 96 of the coil of the electro-magnet.

When the strip 90 is cold, the contact 94 will engage the contact 95 thereby energizing the electro-magnet 84 whereupon the armature 87 is attracted, pulling down contact 77 into engagement with the needle 35. As will be understood when the bimetallic strip 90 is heated by the current passing through the turns 91, the free end of the strip will flex upward thereby breaking the circuit to the electro-magnet and deenergizing the same. The armature 87, as the circuit is broken, will be no longer attracted, and will be pulled upward by the action of the spring acting on the contact 77 to which the armature is connected.

Figure 3:
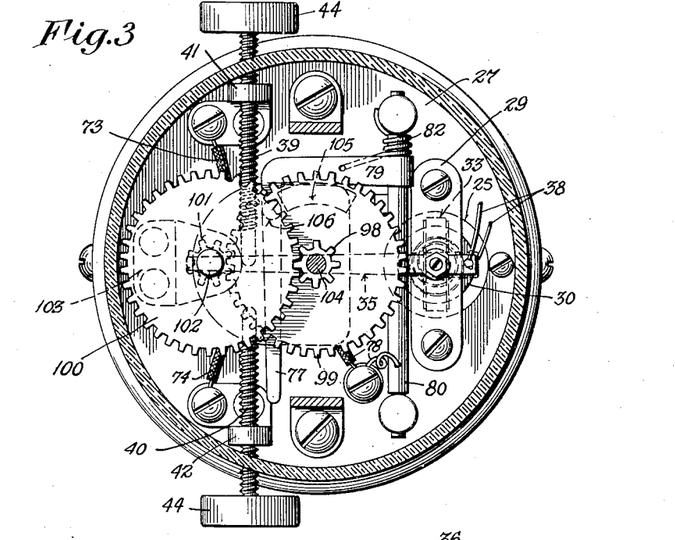
Fig. 3 is a vertical section taken along line 3—3 of Fig. 4, showing a modified form of the invention.
Figure 4:
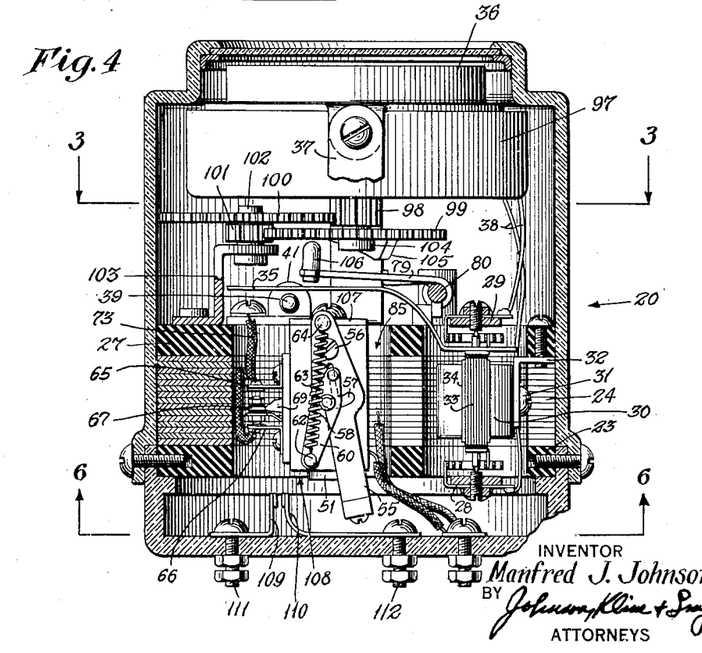
Fig. 4 is a view similar to Fig. 2, but showing a modified form of the invention.
Figures 5, 6:
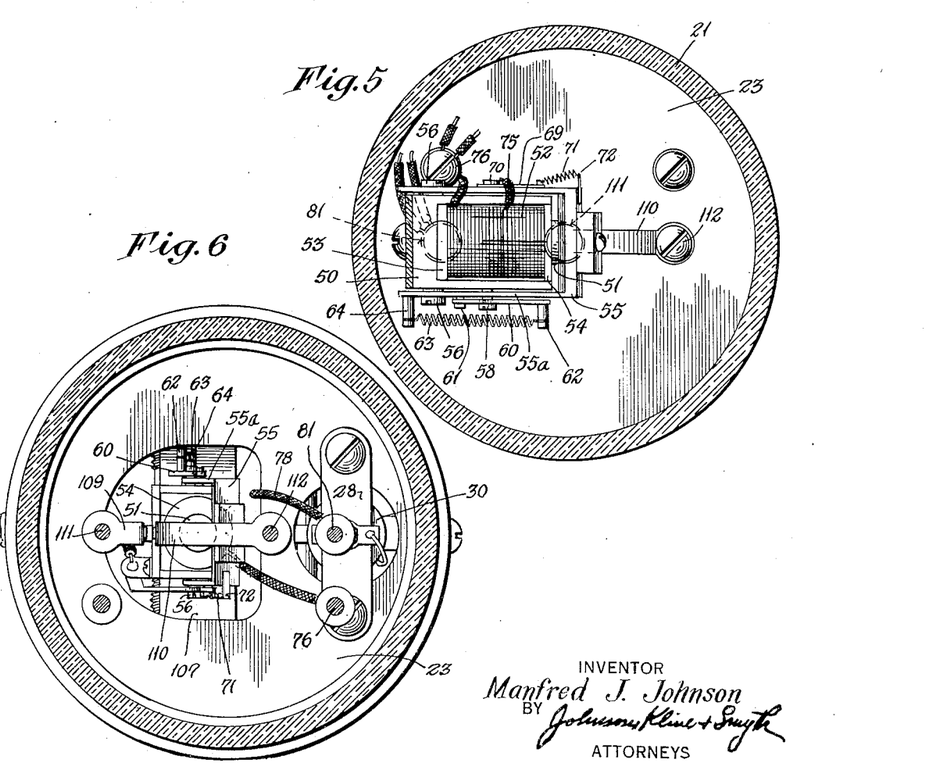
Fig. 5 is a sectional view taken along line 5—5 of Fig. 2.
Fig. 6 is a similar view taken along line 6—6 of Fig. 4.

A modification of the described device is shown in Figs. 3, 4, and 6, wherein a rotary driving means, such as a clock-work mechanism or synchronous motor is substituted for the thermostatic switch and electro-magnet 84 as a means for depressing the arm 79 and the needle 35.

As shown in Fig. 4, a clock-work mechanism or synchronous motor 97 is mounted in the casing 20, below the photoelectric generator cell 36. The said rotary driving means is provided with a pinion 98 which is rotated by the said mechanism. The said pinion drives a gear 99 through a gear train, comprising a gear 100 and a pinion 101 integral therewith, mounted upon a pivot 102, which is supported by means of a bracket 103 attached to the upper surface of the disk 27. The gear 99 rotates freely upon the axis 104 of the rotary driving means and is provided on its lower surface with a cam 105, which intermittently engages and releases a lug 106 protruding from the upper surface of the arm 79. As the gear 99 is rotated by the said driving means, the cam 105 periodically depresses and releases the arm 79 by periodic engagement and disengagement of the cam 105 and the lug 106. As in the case of the device shown in Figs. 1, 2, and 5, depression of the arm 79 causes the contact 77 to engage the needle 35 which in turn engages one of the contacts 39 or 40.

Closure of one of the circuits through contacts 39 or 40 may be employed to operate a suitable control mechanism. For instance, a control mechanism may be used which is similar to that shown and claimed in my prior Patent No. 2,014,194, which comprises, referring now to Figs. 2 and 5, a U-shaped frame 50 to which is secured core member 51 carrying a coil 52. The coil 52 may be held in place on the core 51 by suitable means such as the insulating members 53 and 54. A U-shaped bail 55 is pivotally mounted by screws 56 on the frame 50. The bail member 55, preferably has a limited turning movement about the pivot screws 56 and suitable means, such as a toggle spring arrangement, is provided for normally maintaining the bail in either of its alternate positions.

As shown in Fig. 2, the arm 55a of the bail is provided with a substantially inverted T-shaped slot 57. The staff of the T-shaped slot is directed toward the pivot 56 and the transverse part or head of the T-shaped slot is arcuate with respect to the pivot. Passing through the arcuate portion of the slot is a stud 58 which is fixed upon one of the depending legs of the frame 50, and it will be seen, that the stud 58, riding in the arcuate slot, limits the movement of the bail 55 about the pivot 56.

Pivotally mounted on the outer end of the stud 58 is a lever 60, the upper end of which carries an inwardly projecting pin 61 slidably engaging the staff portion of the T-shaped slot. The opposite end of the lever carries an outwardly projecting stud 62 to which is attached one end of a tension spring 63. The other end of this spring is fastened to the outer end of a stud 64 mounted on a portion of the bail arm 55a, extending beyond the pivot 56.

It will be seen that this arrangement provides a toggle control which acts through the spring 63 and the pivoted lever to snap the bail 55 to one or the other of its extreme positions, as soon as the bail is moved sufficiently to carry the spring 63 over the center of the stud. The lower portion of the U-shaped bail serves as an armature for cooperating with the core member 51 and the legs of the frame 50 substantially to complete a branched closed magnetic circuit through the central core member 52 and the legs of the frame 50.

When the electro-magnetic coil 52 is energized, the bail member or armature 55 will move from either of the positions to which it is normally biased by means of the spring toggle arrangement to a position in line with the core 51 and the ends of the legs of the U-shaped frame 50. With the armature in this position, the spring 63 theoretically will extend over the center of the stud and continued energization of the electromagnet would cause the armature to come to rest with the spring 63 over the center of the stud. However, when the electromagnet is energized, the momentum of the suddenly shifted armature will move the bail actually to carry the spring slightly past the center of the stud.

It will be seen, therefore, that if some means is provided to break the energizing circuit of the electromagnet at the instant the spring 63 first passes over the center of the stud, the spring 63 will act to continue the movement of the bail and the act of momentarily energizing the electromagnet will result in a shifting of the armature and bail 55 from one of its extreme positions to the other.

As best seen in Fig. 2, the means for breaking the circuit of the electromagnet comprises a double throw switch having fixedly mounted contacts 65 and 66 and an intermediate contact 67 which may be moved into engagement with either of the contacts 65 or 66. The contacts 65 and 66 are mounted upon a piece of insulating material 68 which may be secured to the frame 50. The contact 67 is mounted on one end of a switch arm 69 and preferably is insulated therefrom in any suitable manner. As shown, the switch arm 69 comprises a substantially right-angled bell crank which is pivotally mounted on the bail arm 55a at 70. The other end of the switch arm 69 is connected by means of a spring 71 to the bail 55 at 72. When the bail is in the position shown in Fig. 2, the spring 71 biases the switch arm 69 to bring the contacts 67 and 66 together. When the bail 55 is in its other extreme position, the spring 71 will bias the switch arm 69 to bring the contacts 67 and 65 together.

The contact 65 is connected by means of a lead 73 to the contact 39 and the contact 66 is connected by means of a lead 74 to the contact 40. The movable contact 67 is connected by means of a lead 75 to one terminal of the coil 52, and the other terminal of the coil 52 is connected to the grounded terminal 76, carried by the bottom wall of the casing which is adapted to be connected to some suitable ground.

Means are provided for breaking the energizing circuit of the electro-magnet at the instant the spring 63 first passes over the center of the stud, and, in the preferred form of the invention, this means consists of the needle 35 of the D'Arsonval instrument, the contacts 39 or 40, depending upon the position of the needle 35, and the movable contact 77 which is connected by the lead 78 to a suitable source of current.

In the modification shown in Figs. 3, 4, and 6, the control mechanism is mounted in the well 85 of the permanent magnet 24, replacing the electro-magnetic means 84 shown in Fig. 2, which is omitted. Said control mechanism is supported by a bracket 107 fastened to the upper surface of the disk 27. The bail member or armature 55 extends through an aperture 108 in the lower disk 28. Operation of the photoelectric generator cell, D'Arsonval galvanometer, and the control mechanism shown in Figs. 3, 4 and 6 is similar to the operation described with reference to Figs. 1, 2 and 5.

In use, where the device is to affect a control in response to some change in a luminous condition, the device is positioned so that the light emanating from the source strikes or impinges against the cell 36 thereby activating the same. The cell, as it is activated by the rays of light, will produce a current, which current is supplied to the coil 33 of the D'Arsonval instrument causing a deflection of the needle 35. The contact 77, due to the periodic energization of the magnet 84, or periodic depression by the cam 105, will periodically test for some predetermined change in the luminous condition and if the luminous condition has changed sufficiently to cause the needle 35 to move over one or the other of the contacts 39 or 40, a circuit will then be established from the source of current through the lead 78, contact 77, needle 35, leads 73 or 74 and contacts 65 or 66, and 67 to the control mechanism.

By way of illustration, if the needle 35, is positioned over the adjustable contact 39 as shown in Fig. 7, it will be periodically depressed by the arm 79, engaging the contact 77, and also the adjustable contact 39. The circuit, however, is not completed since the movable contact 67 of the control mechanism is not engaged with the contact 65. However, if a change of the luminous condition occurs which causes the needle 35 to move over contact 40, the arm 79 will momentarily depress the needle 35 and set up a circuit from the source of current through the lead 78, the contact 77, the needle 35, the adjustable contact 40, lead 74, contact 66, and movable contact 67 to the electro-magnet of the control mechanism. Upon momentary energization of the said electro-magnet, the bail member or armature 55 of said control mechanism will be moved to its other extreme position, at the same time interrupting the circuit by disengaging contact 67 from contact 66. This movement will engage contacts 67 and 65.

When a reverse change occurs in the luminous condition, the needle 35 will move back over the adjustable contact 39. Periodic depression of the needle 35 by the arm 79 or cam 105 causes the needle to form contact with the adjustable contact 39. A circuit is thus set up from the source of current through the lead 78, the contact 77, the needle 35, adjustable contact 39, lead 73, contact 65, and movable contact 67 to the electro-magnetic coil 52 of the control mechanism. This causes the bail member or armature 55 to move back again to its other extreme position, as shown in Fig. 7, beraking the circuit between contacts 65 and 67 and reengaging contacts 66 and 67.

By adjusting the position of the ends of the contacts 39 and 40 by rotation of the knobs 44, the critical intensity of illumination of the photoelectric generator cell 36 at which the instrument will effect a control of the circuits may be varied at will.

In order to control an external circuit in response to a change in a luminous condition, by means of the motion imparted to the armature 55 of the control mechanism, a pair of spring contacts 109 and 110 are secured to the lower surface of the base 21 by means of terminal bolts 111, and 112. The contacts 109 and 110 are normally held out of contact by virture of their own resiliency, but are so positioned with respect to the bail member or armature 55 of the control mechanism that motion of said armature into one of its extreme positions engages contact 110 and forces it into engagement with contact 109.

The said contacts may be connected in series with an external circuit, for instance, a lighting circuit, which it is desired to control in response to a change in a luminous condition, by means of terminal bolts 111 and 112 which extend through the casing 20 to its exterior and thereby provide means for connecting said contacts in series with the external circuit. The said contacts may be interposed directly in the circuit to be controlled, or they may be interposed in a relay circuit which controls an operating circuit.

Thus, the device of the present invention may be adjusted to control an external circuit for automatically lighting and extinguishing electric signs, store window illumination, street lamps, or the like, depending upon the available illumination, for instance, the intensity of daylight in the vicinity of such lighting means. Similarly, the device may be used to operate counters, safety devices, warning signals, etc. in response to interruption of a beam of light directed upon the photoelectric generator cell 36.

Obviously, the bail member 55 of the control mechanism hereinbefore described may be arranged to close alternately, two switches of the type represented by contact members 109 and 110, depending upon the energization of said control member by motion of the needle 35 from a position above one of the contacts 39 or 40 to a position above the other.

If desired, devices other than the control mechanism comprising an electro-magnet and toggle switch, hereinbefore described and also shown in my prior Patent No. 2,014,194, may be operated by the intermittent closure of the control circuits in the control device by needle 35 in cooperation with adjustable contacts 39 and 40, and the contact member 77.

For instance, the said circuits may be arranged to operate a visual or audible signal when one of the two circuits is closed, the signal being inoperative when the needle is positioned between the said adjustable contacts.

Figure 8:
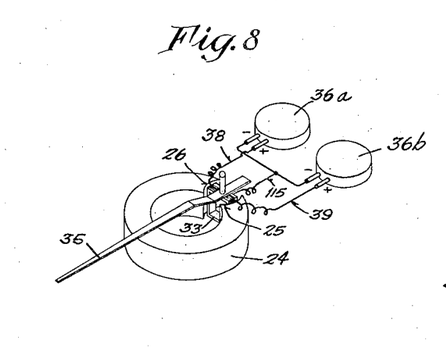
Fig. 8 is a diagrammatic view of another form of the present invention using a pair of photoelectric cells differentially connected.
Figure 9:
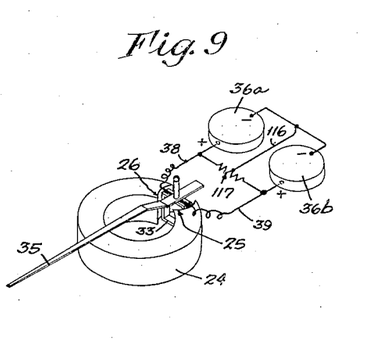
Fig. 9 is similar to Fig. 8, but shows a variation in the wiring of the circuit.

In Figs. 8 and 9 there is shown means for connecting a pair of photoelectric generator cells 36a and 36b to the control device shown in Figures 1 to 7 and described in the foregoing paragraphs. Each of these embodiments includes the elements of the D'Arsonval instrument, shown also in Fig. 7, comprising a permanent magnet 24 having pole faces 25 and 26, a pivotally suspended coil 33 mounted between the pole faces, and the contact needle 35 carried by the coil 33 for deflection thereby.

In Fig. 8, leads 38 and 39 from the ends of the suspended coil 33 are connected respectively to corresponding terminals (for instance, the positive terminals) of photoelectric generator cells 36a and 36b. The opposite terminals of the two photoelectric cells are connected by means of a common lead 115 to the midpoint of the coil 33. When both of the photoelectric generators are equally excited, the current from one cell being equal to that of the other, the two halves of the coil 33 are energized by equal and opposite currents producing magnetic effects which neutralize each other and, therefore, cause no deflection of the coil and the needle 35 by reaction with the permanent magnet 24.

If, however, one of the cells is more strongly excited than the other, the current in the corresponding half of the coil 33 will exceed the opposing current in the other half of said coil and the coil and needle will be deflected laterally through a distance proportional to the difference in excitation of the two photoelectric generators. If the unequal excitation of the cells is reversed, the needle will be correspondingly deflected to the other side.

In Fig. 9, which is otherwise similar to Fig. 8, a variation of the circuit including the photoelectric generator cell 36a and 36b and the coil 33 is illustrated, whereby the necessity for providing a connection to the midpoint of the pivotally suspended coil is avoided. Like terminals (for instance, the positive terminals) of the two photoelectric generators are connected respectively by leads 38 and 39 to the ends of the coil 33. A resistance member 117 having a relatively high resistance as compared with that of the coil 33 is shunted across the terminals of the latter, and the opposite terminals of the photoelectric generators 36a and 36b are connected by means of a common lead 116 to the midpoint of said resistance member.

So long as the two cells are equally excited by illumination thereof, a current flows in the two halves of the resistance member 117 of equal magnitude but opposite in direction. Accordingly, there is no difference in potential between the terminals of the resistance 117 or of the coil 33, and consequently no current flows through the said coil. The needle 35 thus remains at rest.

However, if one of the two cells is more strongly excited than the other, the current in one cell is greater than that in the other cell. Since the resistance of the coil is substantially negligible as compared with the resistance member 117, the current in the network tends to distribute itself so that there is substantially no difference in potential between the terminals of the said resistance member. This requires that the current betwen the two halves of the resistance member 117 should be equal in magnitude and accordingly, the coil 33 is traversed by a current substantially equal to one-half the difference between the current of the respective cells. As a result, the needle 35 is deflected to one side by a distance substantially proportional to the difference in current between the two cells. If the unequal excitation of the cells is reversed, the current through the coil 33 is likewise reversed and the needle 35 is correspondingly deflected to the opposite side.

Obviously, in both of the circuits shown in Figs. 8 and 9, the polarity of both cells may be reversed.

Figure 10:
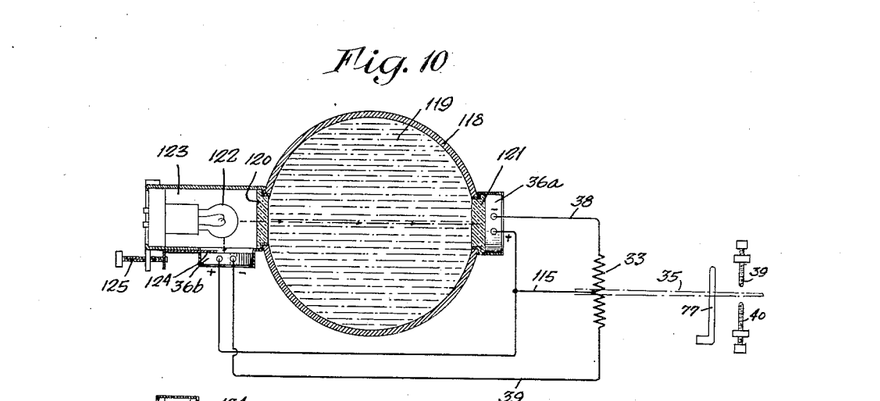
Fig. 10 is a schematic illustration of one application of the form of the invention shown in Figs. 8 and 9, for providing a control device responsive to variations in the translucency of a body of liquid flowing in a conduit.

Fig. 10 illustrates one application of the arrangement shown in Fig. 8. A conduit 118 carrying a liquid 119 is provided with two transparent windows 120 and 121 at opposite sides thereof. A suitable source of light such as an incandescent lamp 122 is mounted in a casing 123 adjacent the window 120 so that the light therefrom traverses the two windows at opposite sides of the conduit, and the liquid between the said windows. The photoelectric generator 36a is disposed behind the other window 121, to receive illumination transmitted by the liquid 119 from the lamp 122. The other photoelectric generator 36b is preferably disposed at the side of the casing 123 to receive illumination directly from the lamp 122.

An opaque screen 124 which is adjustable by means of the thumb screw 125 is provided to regulate the amount of light from the lamp 122 which reaches the cell 36b. By suitable adjustment of the screen, the amount of light reaching the cell 36b may be increased or decreased as desired.

The elements of the control device are shown diagrammatically as including the common lead 115 from the positive terminals of the two photoelectric generators to the midpoint of the coil 33 of the D'Arsonval instrument, the leads 38 and 39 from opposite ends of said coil being connected to the negative terminals of the cells respectively. The intermittently depressed contact member 77 and the adjustable contacts 39 and 40 which cooperate with the needle 35, carried by the coil 33, are likewise shown.

The device is adapted to control the degree of translucency or the color, of the liquid 119 passing through the conduit between windows 120 and 121.

In order to adjust the device to provide a standard of comparison, the lamp 122 is illuminated and the conduit 118 is filled with the liquid 119 having the desired light-transmitting characteristics. The screen 124 is adjusted so that the excitation of the cells 36a and 36b is equal, whereby the needle 35 remains in its neutral or midposition between the adjustable contacts 39 and 40. If the liquid passing through the conduit becomes less translucent, for instance, because of an increased amount of suspended material therein, or if the color of the liquid becomes darker, the excitation of the cell 36a will decrease while that of cell 36b remains the same. The needle 35 will be correspondingly deflected to one side. Conversely, if the liquid becomes lighter in color or more translucent, excitation of the cell 36a will increase, exceeding that of cell 36b and the needle 35 will be deflected in the opposite direction. Intermittent depression of the needle 35 by the contact member 77 tests for the position of the said needle at intervals, and cooperation of the said needle with the adjustable contacts 39 and 40, may be arranged to operate a signal, or to energize some device in the liquid control system to correct the condition of the liquid flowing through the conduit. By adjusting the distance between the ends of contacts 39 and 40, the permissible range of variation in the condition of the said liquid within which it is desired that the control or signal should remain inoperative may be widened or narrowed.

The wiring arrangement shown in Fig. 9 may be substituted for that of Fig. 8, in the application of the control device shown in Fig. 10.

Figure 11:
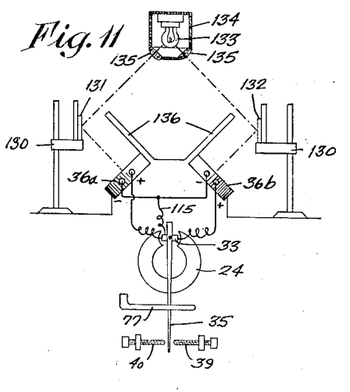
Fig. 11 is a schematic illustration of another application of the invention as shown in Fig. 8 for providing a device responsive to variations in the comparative amount of light reflected from a material used as a standard of comparison and from a sample to be compared therewith.

Fig. 11 illustrates another application of the control mechanism shown in Fig. 8. A pair of supports 130 are provided, adapted respectively to hold a specimen of material 131 having a surface of the desired light-reflecting characteristics to be used as a standard of comparison, and another specimen of material 132, the surface of which is to be compared with the said standard surface as to its light-reflecting properties. A suitable source of light, such as an incandescent lamp 133 is mounted in a housing 134 having a pair of windows or lenses 135 for directing beams of light against the surfaces of the specimens 131 and 132 to be compared. The two photoelectric generator cells 36a and 36b are disposed respectively to receive the light reflected from the standard of comparison 132 and the test specimens 131, screens 136 being provided, if necessary, to prevent the reflected light from either of the specimens and the direct illumination from the light source from reaching both cells at the same time.

The elements of the control mechanism are shown schematically and arranged in the manner shown in Fig. 8, although the wiring arrangement of Fig. 9 may be substituted therefor. The ends of the coil 33 are connected respectively to the positive terminals of the two photoelectric generator cells 36a and 36b, while the negative terminals of the latter are connected by means of the common lead 115 to the midpoint of the coil 33.

If the light-reflecting properties of the test specimen 132 and the standard 131 are substantially equal, the light reflected therefrom and falling upon the cells 36a and 36b respectively, produces currents in the two halves of the coil 33 which are substantially equal and which neutralize each other. The needle 35 is not deflected but remains at rest.

If the light reflected from the test specimens 132 is greater or less than that reflected from the standard specimen 131, the needle 35 will be correspondingly deflected to one side or the other by reason of the unequal current flowing in the respective halves of the coil 33.

By adjusting the contacts 39 and 40 so that needle 35 is positioned between them when the surfaces of two specimens to be compared reflect the same amount of light and to move over one or the other of the said contacts, depending upon reflection of more or less light from the test specimen 132 than from the standard comparison 131, the circuit which is closed by the deflection of the needle over the said contacts and by intermittent depression of said needle by the contact member 77, may be arranged to operate a signal to indicate the disparity or similarity of the compared specimens, or to operate some other automatic device.

As in the case of the application illustrated in Fig. 10, the permissible range of variation in the light-reflecting characteristics of the test specimen and standard of comparison may be varied by widening or narrowing the gap between the ends of contacts 39 and 40. By suitably narrowing the said gap, the range of variation may be decreased until it is substantially nil.

The said arrangement may be used to compare any characteristics of the surfaces of specimens 131 and 132 which affect the light-reflecting power thereof, such as color depth, lustre, relative roughness, etc.

An important practical advantage of the arrangement shown in Figs. 8 to 11, is that the amount of light supplied by the single light source is not critical since it energizes both of the photoelectric cells. The response of the control device is not affected by variations in the intensity of illumination of the said light source which occurs from time to time due to extraneous conditions such as a drop in line voltage or internal conditions such as the gradual burning out of the filament of the lamp.

In the arrangement shown in Figs. 8 to 11, the elements of the D'Arsonval instrument, the adjustable contacts 39 and 40, and the means for intermittently depressing the needle 35 may be conveniently disposed in a casing as illustrated in Figs. 1 to 7. However, the photoelectric generators 36a and 36b are generally separate from the said casing to permit disposition thereof as desired with reference to the luminous conditions to be compared and tested.

In using the device illustrated in Fig. 10, no theoretical knowledge on the part of the user is required, since it is merely necessary to observe the condition of the water or other liquid flowing through the pipe, and then to adjust the screw 125 until the needle 35 is positioned between the contacts 39 and 40, whereby no signal or control is produced at the time when the color or translucency of the liquid in the pipe is that desired.

Likewise, with the device shown in Fig. 11, no theoretical knowledge concerning the manner in which the device functions is required for its successful use, and the device may be used by any mechanic or worker found in the industry. To adjust the device, it is merely necessary to place identical specimens in both positions and to adjust the contacts 39 and 40 so that the needle 35 is positioned between them. For comparing a test specimen with a standard, it is merely necessary to place the standard specimen in one position and the test specimen in another position and observe whether or not a signal or control is given as a result of the deflection of the needle 35 over one or the other of the contacts 39 and 40. If there is a permissible range of differentiation between the standard specimen and the test specimen, it is merely necessary to take specimens just beyond the permissible extremes and adjust the screws 39 and 40 until signals are just received. This is of great practical importance in industries where up to the present photoelectric responsive means have required special technical skill and theoretical knowledge regarding them for their successful operations.

In connection with the form of the invention shown in Fig. 11, if desired, the portion of the control mechanism including the contact 77 may be omitted. In this case, visual observation of the needle 35 of the galvanometer may be employed to indicate when the test specimens are off standard.

It will be apparent to those skilled in the art that the test specimens may be brought into the position to be tested either by hand or by a suitable mechanical means such as conveyors, etc., and in such case the operation of the circuit closer or contact 77 would be timed so that the contact would operate when the specimen was in position to be tested.

The photoelectric control devices have been described specifically as having photoelectric cells of the current-generating or barrier type. However, by inserting a source of direct current at constant E. M. F. in series with the cells in the well-known manner, photoelectric cells of the variable resistance type or of the emission type may be substituted therefor. However such modifications have the disadvantage that variations in the voltage of the said source would cause variations in the response of the devices to changes in the luminous condition. Cells of the emission type would require vacuum tube amplification, whereby the construction and operation of the devices are greatly complicated, and the cost and maintenance thereof enormously increased.

Variations and modifications may be made within the scope of this invention and portions of the improvements may be used without others.

I claim:

1. In a system for effecting a control in response to variations in the magnitude of a luminous condition, a plurality of control circuits; a plurality of spaced contacts included respectively in said circuits; a contact member freely movable over a range adjacent said contacts and adapted upon engagement with said spaced contacts to establish said circuits respectively; a photoelectric means responsive to said luminous condition and directly controlling the free movement of said movable contact member to determine its position relative to the respective contacts in accordance with the magnitude of said luminous condition; and automatic means periodically moving said movable contact member to adjacent contact-engaging position for closing a selected control circuit.

2. A control device for effecting a control in response to variations in the magnitude of a luminous condition, comprising a light-sensitive means for producing a current substantially proportional to the magnitude of the luminous condition; a plurality of control circuits; electromagnetic means included in said circuits for effecting a control operation upon energization thereof; a plurality of spaced contacts included respectively in said circuits; a circuit-selecting member freely movable adjacent said contacts, its free movement being controlled by the current produced by said light sensitive means, said member being adapted to cooperate with the said contacts upon engagement therewith for selectively establishing said circuits according to the magnitude of said luminous condition; and an automatic periodically operated circuit-closing means for moving said movable member to adjacent contact-engaging position for intermittently closing the selected circuit.

3. In a control device for effecting a control in response to the magnitude of a luminous condition, light-sensitive means for producing a current substantially proportional to the magnitude of said luminous condition; a plurality of control circuits; electro-magnetic means included in said circuits for effecting a control operation upon selective energization of said circuits; a switch in each of said circuits operated by said electro-magnetic means for interrupting the circuit in which it is included upon initial energization of said circuit, and for reestablishing said circuit upon the initial energization of one of the other circuits; a plurality of spaced contacts included respectively in said circuits; a circuit-selecting member freely movable adjacent said contacts, its free movement being controlled by the current produced by said light-sensitive means, said member being adapted to cooperate with said contacts upon engagement therewith for selectively establishing said circuits according to the magnitude of said luminous condition; and a periodically operated circuit-closing member automatically moving said movable member to adjacent contact-engaging position for intermittently closing the selected circuit.

4. In a control device for effecting a control in response to the magnitude of a luminous condition, a photoelectric generator cell adapted to produce a current substantially proportional to the magnitude of a luminous condition; a galvanometer directly responsive to the current produced by said photoelectric generator cell; a freely deflectable member carried by the coil of said galvanometer, the deflection of which is substantially proportional to the magnitude of said luminous condition; a plurality of control circuits adapted upon selective energization thereof to effect a control operation; a plurality of contacts included respectively in said control circuits, said deflectable member being freely movable into successive positions adjacent said contacts and adapted to cooperate with the latter upon engagement therewith for selectively establishing said control circuits; and a periodically operated circuit-closing means for automatically moving said deflectable member to adjacent contact-engaging position for intermittently closing the selected circuit.

5. In a control device for effecting a control in response to the magnitude of a luminous condition, a photoelectric generator cell adapted to produce a current substantially proportional to the magnitude of a luminous condition; a galvanometer directly responsive to the current produced by said photoelectric generator cell; a deflectable member carried by the coil of said galvanometer, the deflection of which is substantially proportional to the magnitude of said luminous condition; a plurality of control circuits adapted upon selective energization thereof to effect a control operation; a plurality of spaced contacts adjacent said deflectable circuit-closing member, the latter being adapted to move over said contacts successively upon deflection thereof; a contact member common to all of said control circuits; and automatic means for periodically actuating said contact member to engage said deflectable member for establishing a circuit thereto and to move said member into engagement with the contact over which it is positioned for closing the control circuit associated with said contact.

6. In a control device as defined in claim 3, means for periodically operating said circuit-closing member comprising a rotary timing mechanism; a cam driven thereby for actuating said member; and a casing enclosing said control device, said light-sensitive means comprising a photoelectric cell of the current-generating type disposed in one wall of the casing.

7. In a control device as defined in claim 3, electromagnetic means for operating said circuit-closing member; a circuit for said electromagnetic means including a bimetallic switch, said switch being adapted automatically to energize said circuit intermittently; and a casing enclosing said control device, said light-sensitive means comprising a photoelectric cell of the current-generating type disposed in one wall of the casing.

8. In a control device for effecting a control in response to variations in the relative magnitude of a pair of luminous conditions, a pair of light-sensitive means for producing currents substantially proportional respectively to the magnitudes of a pair of luminous conditions, said light-sensitive means being differentially connected to produce a resultant electric effect substantially proportional to the difference in magnitudes of said luminous conditions; a plurality of control circuits for effecting a control operation upon selective energization thereof; a plurality of contacts included respectively in said control circuits; a freely movable circuit-selecting member directly controlled by said resultant electric effect and adapted to cooperate with said contacts for selectively establishing said control circuits; and a periodically operated automatic circuit-closing means for moving with said movable member to contact-engaging position for closing the selected circuit.

9. In a control device for effecting a control in response to variations in the relative magnitudes of a pair of luminous conditions, a pair of photoelectric means for producing currents substantially proportional in magnitude respectively to the magnitudes of a pair of luminous conditions, said means being differentially connected to produce a resultant electric effect proportional to the difference in magnitude between the said luminous conditions; a pair of control circuits for effecting a control operation upon selective energization thereof; a pair of spaced contacts included respectively in said control circuits; a circuit-selecting member freely movable over a range adjacent said contacts in response to said resultant electric effect and adapted to cooperate with said contacts to close said circuits selectively in accordance with the difference in magnitude between the said luminous conditions, said member being ineffective to close either of said circuits in a position between the contacts;

means for adjusting the spacing between said contacts, whereby the sensitivity of the control may be varied; and circuit-closing means periodically operated to move said circuit-selecting member to contact-engaging position for closing the selected circuit.

10. In a control device for effecting a control in response to variations in the relative light-absorbing characteristics of material, a single light source for illuminating said material; a photoelectric means for producing a current substantially proportional to the magnitude of the light emitted by said material; a second photoelectric means for producing a current substantially proportional to the light emitted by said light source, the two photoelectric means being connected to produce an electric effect substantially proportional to the difference between the amount of light respectively received by said photoelectric means; a plurality of control circuits; control-selecting means actuated directly by variations in said differential electric effect; and periodically operative means adapted when operated to act upon said control-selecting means for closing the selected control circuit.

11. In a system for effecting a control in response to a change in the magnitude of a luminous condition, a circuit-selecting member freely movable over a predetermined range in response to variations of said luminous condition; spaced contact means positioned adjacent the range of movement of said movable member and adapted to cooperate therewith for selectively closing one of a plurality of control circuits; and periodically operated circuit-closing means cooperating with said freely movable member to move it to contact-engaging position for closing the selected circuit.

12. In a system for effecting a control in response to a change in the magnitude of a luminous condition, a circuit-selecting member freely movable over a selected range in response to variations of said luminous condition; spaced contact means positioned adjacent the range of movement of said movable member, and adapted to cooperate therewith for selectively closing one of a plurality of control circuits; and periodically operated circuit-closing means common to all of said control circuits, for intermittently establishing a circuit to said movable member, and for moving said member to contact-engaging position to close a selected circuit for each periodic operation thereof.

13. In a system for effecting a control in response to a change in magnitude of a luminous condition, a photoelectric cell of the current-generating type, said cell being adapted to produce a current substantially proportional to the quantity of light received by said cell; a circuit-selecting member freely movable over a predetermined range in direct response to variations in the said current; spaced contact means positioned adjacent the range of movement of said movable member, and adapted to cooperate therewith for selectively closing one of a plurality of control circuits; and periodically operated circuit-closing means cooperating with said freely movable member to move it to contact-engaging position for closing a selected circuit.

14. In a control device for effecting a control in response to a change in the magnitude of a luminous condition, light-sensitive means responsive to said condition; a circuit-selecting member freely movable over a predetermined range, movement of said member being directly responsive to said light-sensitive means; a plurality of spaced contacts adjacent said range of movement, and adapted to cooperate with said member for selectively closing one of a plurality of control circuits; a periodically operated circuit-closing means cooperating with said member to move it to contact-engaging position for each periodic operation thereof to close one of said control circuits; control means operated by closure of said circuits respectively to effect the desired control; and means operated by said control means to interrupt the selected control circuit after initial closure thereof and to reestablish said circuit upon initial closure of one of the other control circuits.

15. In a system for effecting a control in response to a change in the magnitude of a luminous condition, a circuit-selecting member freely movable over a selected range in response to variations of said luminous condition; spaced contact means positioned adjacent the range of movement of said movable member and adapted to cooperate therewith for selectively closing one of a plurality of control circuits; periodically operated circuit-closing means cooperating with said freely movable member to move it to contact-engaging position for closing the selected circuit; and means for adjusting the spacing of said contacts to vary the magnitude of the change of said luminous condition required for effecting a change in the energization of said control circuits.

16. A device for effecting a control in response to predetermined changes in a luminous condition, comprising a photoelectric cell of the current-generating type adapted to produce a current substantially proportional to the intensity of said luminous condition; a galvanometer device directly responsive to said current; a freely deflectable circuit-closing member positioned by the said galvanometer device; a pair of spaced contacts adjacent said deflectable member adapted to cooperate therewith for selectively closing one of a pair of control circuits; a circuit-closing member common to both control circuits for engaging said deflectable member to establish a circuit thereto and for moving said member into contact-engaging position to close said circuits respectively; automatic means intermittently operated to move said circuit-closing member to deflector-engaging, circuit-closing position; electromagnetic means common to both of said circuits, successive intermittent energizations of said means alternately effecting a pair of control operations; and selective switch means controlled by said electromagnetic means upon initial energization of one of the control circuits to render the other control circuit operative and the initially energized circuit inoperative.

17. In a system for effecting a control in response to a change in the relative magnitudes of a pair of luminous conditions, a pair of photoelectric cells of the current-generating type, adapted to produce currents substantially proportional to the respective magnitudes of the pair of luminous conditions, said cells being connected differentially to produce a resultant current which is a direct function of the difference between the magnitude of said luminous conditions; current-responsive means operated by said current, comprising a deflectable circuit-selecting member freely movable over a predetermined range in response to variations of said current; spaced contact means positioned adjacent the range of movement of said movable member and adapted to cooperate therewith for selectively closing one of a plurality of control circuits; and a periodically operated circuit-closing means cooperating with said freely movable member to move it to contact-engaging position for closing the selected circuit.

18. In a system for effecting a control in response to a change in the relative magnitudes of a pair of luminous conditions, a pair of photoelectric cells of the current-generating type, adapted to produce currents substantially proportional to the respective magnitudes of a pair of luminous conditions, said cells being connected differentially to produce a resultant current which is a direct function of the difference between the magnitude of said luminous conditions; current-responsive means, operated by said current, comprising a deflectable circuit-selecting member freely movable over a predetermined range in response to variations of said current; spaced contact means positioned adjacent the range of movement of said movable member and adapted to cooperate therewith for selectively closing one of a plurality of control circuits; and a periodically operated circuit-closing means common to all of said control circuits for periodically establishing a circuit to said movable member and for moving said member to contact-engaging position to close the selected circuit for each periodic operation thereof.

19. In a control device for effecting a control in response to the relative light-absorbing properties of a pair of specimens, a single light source for illuminating said specimens; a pair of photoelectric cells respectively illuminated by the light reflected from said specimens for generating currents substantially proportional respectively to the intensity of the reflected beams of light; a plurality of control circuits; circuit-selecting means actuated by the total currents generated by said cells; and periodically operative means adapted when operated to act upon said circuit-selecting means for closing the selected circuit.

20. In a control device for effecting a control in response to variations in the light-transmitting properties of a material, a light source for projecting a beam of light through said material; a photoelectric cell illuminated by the transmitted beam for producing a current substantially proportional to the light transmitted by said material; a second photoelectric cell directly illuminated by said light source for producing a current substantially proportional to the intensity of illumination thereof; a plurality of control circuits; circuit-selecting means actuated by the total currents produced by said cells; and periodically operative means adapted when operated to act upon said circuit-selecting means for closing the selected circuit.

21. In a control device for effecting a control in response to variations in the light-transmitting properties of a material, a light source for projecting a beam of light through said material; a photoelectric cell, illuminated by the transmitted beam, for producing a current substantially proportional to the light transmitted by said material; a second photoelectric cell directly illuminated by said light source for producing a current substantially proportional to the intensity of illumination thereof; a plurality of control circuits; circuit-selecting means actuated by the total currents produced by said cells; periodically operative means adapted when operated to act upon said circuit-selecting means for actuating the selected circuit; and means for adjusting the proportionate amount of light received from said light source by the second photoelectric cell whereby a predetermined current difference may be correlated with a selected degree of translucence.

22. In a control device for effecting a control in response to variations in the relative light-absorbing characteristics of a material, a single light source for illuminating said material; a photoelectric means for producing a current substantially proportional to the magnitude of the light received from said material; a second photoelectric means for producing a current substantially proportional to the light received from said light source; a plurality of control circuits; circuit-selecting means actuated directly by and differentially responsive to the total currents produced by said respective photoelectric means; and means periodically acting upon said selecting means and testing for a variation in the currents produced and cooperative with said circuit-selecting means for completing a selecting circuit in response to predetermined variations in the difference between said total currents.

23. In a control device for effecting a control responsive to variations in the relative light-absorbing characteristics of a material, a single light source for illuminating said material; a photoelectric means for producing a current substantially proportional to the magnitude of the light received from said material; a second photoelectric means for producing a current substantially proportional to the light received from said light source; a plurality of control circuits; a galvanometer having a contact operated by a coil, one part thereof being energized by the total current produced by one of said photoelectric means, and the other part being differentially energized by the total current produced by the other photoelectric means, the deflection of said galvanometer coil and movement of the contact carried thereby being substantially proportional to the difference in the illumination between the two photoelectric means; and means for periodically acting on said movable contact to close one of said control circuits upon deflection of said coil.

MANFRED J. JOHNSON.

CERTIFICATE OF CORRECTION.

Patent No. 2,331,475.　　　　　　　　　　　　　　October 12, 1943.

MANFRED J. JOHNSON.

It is hereby certified that error appears in the printed specification of the above numbered patent requiring correction as follows: Page 1, second column, line 19, for "the" first occurrence, read --one--; page 8, second column, line 52, claim 8, after "moving" strike out "with"; and that the said Letters Patent should be read with this correction therein that the same may conform to the record of the case in the Patent Office.

Signed and sealed this 14th day of December, A. D. 1943.

(Seal)　　　　　　　　　　　　　　　　　　　　　　Henry Van Arsdale,
　　　　　　　　　　　　　　　　　　　　　　Acting Commissioner of Patents.